Patented Jan. 11, 1927.

1,613,689

UNITED STATES PATENT OFFICE.

CHARLES W. YOUNG, OF OMAHA, NEBRASKA.

PLASTER REVIVER.

No Drawing.    Application filed May 17, 1923. Serial No. 639,711.

My invention relates to ingredients of plastic compositions, and particularly to plaster of which the principal ingredient is calcined gypsum. Hard plaster, for use in wall surfacing and the like, is commonly made from the mineral gypsum, which is a crystalline form of calcium sulphate, the mineral being ground to the required fineness, and then calcined at temperatures between 300° F. and 600° F., to drive off a definite portion of the water of crystallization. For use, the dry plaster is mixed with suitable proportions of sand and water, to form a plastic mass suitable for spreading with a trowel. Besides the calcined gypsum, the dry plaster of commerce usually contains a small proportion of some retarder or material which will delay the setting of the plastic mixture. Ordinarily, the plaster must be used within a limited time after its manufacture, in order that it may be capable of forming a plastic mixture which may be satisfactorily spread upon a wall, and which will have the desired adhesive characteristics to make it stay in place when spread. The plastic mixture made with fresh plaster has a certain smoothness to the touch, and works or spreads freely under the trowel; masses thereof readily adhere to lathed surfaces or to previously hardened coats, and the cohesiveness of the mixture is very apparent. Fresh plaster, having the described characteristics, is said to be "fat", while plaster which has been made for a considerable time is said to have "lost its fat". The plastic mixture made from old plaster is markedly different from that made with fresh or "fat" plaster, the former being noticeably "short" or lacking in cohesiveness, so that masses thereof readily separate and fall apart, the mixture not adhereing readily to lathed walls or to previously plastered surfaces, the material when worked under the trowel feeling coarse and gritty, the trowel not slipping freely over the material, and the labor of applying a coating of the material being so great that in many instances its use is practically impossible. The time required for plaster to become old and dead, or to lose its fat, varies from three to eight months, depending upon climatic conditions, it being assumed always that the plaster is properly stored in a dry place, and does not become moistened except, possibly, by absorption of atmospheric moisture. It has been found that, except for the difficulties of working or applying the plastic mixture, the old or dead plaster is equally as good as that freshly made; which is to say that if it can be successfully applied to a surface, the mixture made with old plaster will set to the same hardness and strength, and in all other respects be indistinguishable from the coating made with fresh plaster. Old or dead plaster may be revived by re-calcining the same, and the working qualities may be slightly improved by re-grinding, without re-calcining the material. Such procedure for reviving the dead plaster cannot usually be carried out, however, for economic reasons, since the cost of transportation from the place of storage back to the plaster mill ordinarily would amount to as much as, if not more than, the value of the raw gypsum from which the plaster is originally made. Because of the conditions above briefly stated, plaster which has been in storage and which is not used within a period averaging about six months from the time it is made, is usually considered as a complete loss and the material discarded as waste; the only expedient ordinarily available for utilizing the dead material being to mix a small proportion thereof with new or freshly made plaster, and with this procedure the derogatory effect of the dead material in the mixture is often such that there is no actual economic benefit from such utilization.

My invention provided means by which the above mentioned losses and difficulties resulting from the deterioration of gypsum plaster may be entirely avoided. The material provided by my invention may be mixed in suitable proportions with old or dead plaster, at the time that the mixture with sand and water is made, to produce a plastic composition which has the same working qualities as that made from fresh plaster; or my plaster reviver may be incorporated with the ordinary plaster when the latter is first made, to produce a plaster which may be used at any time and which will not deteriorate in its working qualities by storage for any length of time.

The raw material from which my plaster reviver is prepared is known as bentonite, and is a clay-like mineral substance found in Wyoming, South Dakota, and many other localities. The composition of bentonite varies slightly in different deposits, but, so far as I have been able to ascertain, any of the varieties may be satisfactorily employed for the product comprising my invention. The raw bentonite will absorb about three times its weight or seven times its volume of water, and after such absorption its volume is increased to from six to eight times that of the original volume of the dry material. The wetted and expanded material forms a gelatinous mass which feels smooth and soapy, and if the wetted and expanded material be agitated with a quantity of water greater than that which it will directly absorb, a large proportion of the material will remain in suspension indefinitely, indicating that such material is colloidal.

Published analyses (see Report of Investigations, U. S. Bureau of Mines, Serial No. 2289, October, 1921) of specimens of bentonite from various localities, give the constituents thereof as 54% to 63% silica ($SiO_2$), 12% to 25% aluminium oxide ($Al_2O_3$), 2½% to 4% ferric oxide ($Fe_2O_3$), ½% to 4½% each of lime (CaO), magnesium oxide (MgO), potassium oxide ($K_2O$), and sodium oxide ($Na_2O$), and traces of other constituents. It is inferable from the highly colloidal properties of the material that the silicon may be present in the form of silicic acid ($H_2SiO_4$), and the aluminium and iron as hydrates ($Al(OH)_3$ and $Fe(OH)_3$) rather than oxides, as said hydrates, as well as silicic acid, have a gelatinous or colloidal form. It appears probable also that the lime, sodium and potassium are in some combined form other than oxides or hydrates, since the bentonite does not show an alkaline reaction to ordinary indicators, and appears to be perfectly neutral.

In the preparation of my plaster reviver from the raw bentonite, the same is placed directly in a calcining pan or kettle of substantially the type usually employed for calcining gypsum in the manufacture of plaster. The material is then heated to a temperature of about 500° F., being agitated by suitable means so that a uniform temperature will be attained throughout the material. When the raw material contains considerable free or uncombined moisture it forms waxy masses, which when dried break easily into flakes or scales. When not too slowly heated, the larger masses tend to crumble spontaneously, due to the formation of steam within the same, so that when the heating of the material has been continued long enough to drive off the free moisture, all of the larger masses will be broken or crumpled into relatively small pieces. The roasting or calcining of the material is continued until specimens taken from the kettle will respond to the following test: A portion of the test material is placed upon a glass plate and pressed firmly against the surface with a flat metal implement, such as a trowel, which is rubbed over the material as if to spread the same, under pressure, over the glass surface. If the material then sticks or adheres to the glass, further calcining is required, and when the roasting or calcination is completed the material under said test shows no adhesion to the glass. Upon completion of the roasting or calcination the material is ground to approximately the same fineness as gypsum plaster, and is then ready for use. The prepared material has characteristics markedly different from the raw bentonite. When mixed with water, its absorption is such that the volume of the wetted material is expanded to only about twice that of the dry material. The colloidal properties of the raw material are entirely absent from the prepared material, the latter separating promptly from any excess of water over that which is directly absorbed in the proportion above stated.

Old or dead plaster, which would ordinarily be unusable, may be fully restored to a working condition indistinguishable from that of freshly made plaster, by the addition of 1% to 4% of my prepared bentonite or reviving material. A like proportion of the reviver may be mixed with fresh plaster, and the composition so formed will not become dead or lose its working qualities after storage for any length of time. The revived plaster sets and hardens in the same period of time that would be required if the reviving material were not used, and there is no drying shrinkage resulting from the use of said material.

I am aware that the use of raw bentonite has been proposed as an ingredient of wall plaster, to increase the plasticity thereof, but such use is objectionable on account of retarding the setting of the plaster, and on account of the drying shrinkage which results from the high absorbency of the raw material. Clays of various kinds have also been used to increase plasticity and enable the use of dead plaster, but such materials are objectionable for the same reasons as raw bentonite. Raw bentonite and clays will also wash or dissolve out of the hardened plaster in which they are used, causing running or streaking of the plastered walls if the same become wetted. As distinguished from such materials, my prepared bentonite will not wash or dissolve out of the hardened plaster, and actually increases the water-resistant qualities thereof. By reason of the latter characteristic, the prepared bentonite may be advantageously employed as a constituent of exterior plasters and plastic coating compositions, such as stucco, staff, and mortar made with hydraulic or Portland cement. When my material is used with any of the foregoing, it increases the plasticity and adhesiveness of the composition, so that the same may be worked or spread more easily, or so that a larger proportion of sand or other inert material may be carried without detracting from the working qualities of the composition.

Now, having described my invention, what I claim and desire to secure by Letters Patent is:

1. A plaster-reviving composition consisting of bentonite calcined sufficiently only to substantially destroy the colloidal properties of the raw material.

2. Plaster containing as an ingredient 1% to 4% of bentonite calcined sufficiently only to substantially destroy the colloidal properties thereof.

3. A composition for use as described, consisting of bentonite calcined at a temperature of about 500°F., and ground to a pulverulent form.

4. A composition for use as described, consisting of bentonite calcined at a temperature of about 500°F. for a sufficient time only to destroy the colloidal properties of the raw material.

CHARLES W. YOUNG.